(12) United States Patent
Iozia

(10) Patent No.: US 12,337,563 B2
(45) Date of Patent: Jun. 24, 2025

(54) METHOD OF PRODUCING A TIRE EQUIPPED WITH AN ELECTRONIC DEVICE

(71) Applicant: Bridgestone Europe NV/SA [BE/BE], Zaventem (BE)

(72) Inventor: Francesco Iozia, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 0 days.

(21) Appl. No.: 18/722,628

(22) PCT Filed: Dec. 22, 2022

(86) PCT No.: PCT/EP2022/087455
§ 371 (c)(1),
(2) Date: Jun. 21, 2024

(87) PCT Pub. No.: WO2023/118422
PCT Pub. Date: Jun. 29, 2023

(65) Prior Publication Data
US 2025/0042113 A1 Feb. 6, 2025

(30) Foreign Application Priority Data
Dec. 22, 2021 (IT) .................. 102021000032225

(51) Int. Cl.
*B29D 30/00* (2006.01)
(52) U.S. Cl.
CPC .. *B29D 30/0061* (2013.01); *B29D 2030/0083* (2013.01)
(58) Field of Classification Search
CPC ............ B29D 30/0061; B29D 30/0601; B29D 30/0633; B29D 30/0662; B29D 30/0681;
(Continued)

(56) References Cited

U.S. PATENT DOCUMENTS 4,303,380 A * 12/1981 Frankforter ........... B29C 73/325
100/231
8,109,312 B2 * 2/2012 Schober .................. B29C 73/12
156/95

(Continued)

FOREIGN PATENT DOCUMENTS

CN          104589929 A  *  5/2015
EP            3168068 A1      5/2017
(Continued)

OTHER PUBLICATIONS

Seto H, JP-2015107690-A, machine translation. (Year: 2015).*
Zhou H, CN-104589929-A, machine translation. (Year: 2015).*

*Primary Examiner* — Sedef E Paquette
(74) *Attorney, Agent, or Firm* — Patterson Intellectual Property Law, PC

(57) ABSTRACT

Production method of a tyre (1) provided with an electronic device (7) and having the steps of: coupling the electronic device (7) to a support (8) provided with at least one at least partially green rubber component (9); forming the green tyre (1) having an innerliner (6); inserting the green tyre (1) into a vulcanization mould (20); subjecting the green tyre (1) which is inside the vulcanization mould (20) to a vulcanization process; extracting the vulcanized tyre (1) from the vulcanization mould (20) at the end of the vulcanization process; and applying the support (8) containing the electronic device (7) on the innerliner (6) of the vulcanized tyre (1) after the tyre (1) has been extracted from the vulcanization mould (20) when a surface temperature of the innerliner (6) deriving from the heating of the vulcanization process is higher than 90° C.

20 Claims, 9 Drawing Sheets

(58) Field of Classification Search
CPC ........ B29D 30/0685; B29D 2030/0072; B29D 2030/0077; B29D 2030/0083; B29D 2030/0682; B29D 2030/0686; B29D 2030/0694; B29D 2030/0695; B60C 2019/004
USPC .................................. 156/110.1; 426/14, 26
See application file for complete search history.

(56) References Cited

U.S. PATENT DOCUMENTS

| | | | |
|---|---|---|---|
| 2004/0079471 A1* | 4/2004 | Brivio ..................... | B60C 11/16 156/114 |
| 2011/0056612 A1* | 3/2011 | Sugimoto ............... | C08L 53/00 156/110.1 |
| 2017/0021579 A1* | 1/2017 | Bambeck ............... | H01Q 1/225 |
| 2017/0277992 A1* | 9/2017 | Janko ........................ | C09J 5/06 |
| 2020/0399498 A1* | 12/2020 | Pino ..................... | C08K 5/3492 |
| 2024/0317000 A1* | 9/2024 | Aoki .................. | B60C 23/0493 |

FOREIGN PATENT DOCUMENTS

| | | | |
|---|---|---|---|
| JP | 2015107690 A | * | 6/2015 |
| WO | 2011040921 A1 | | 4/2011 |
| WO | 2021126199 A1 | | 6/2021 |

\* cited by examiner

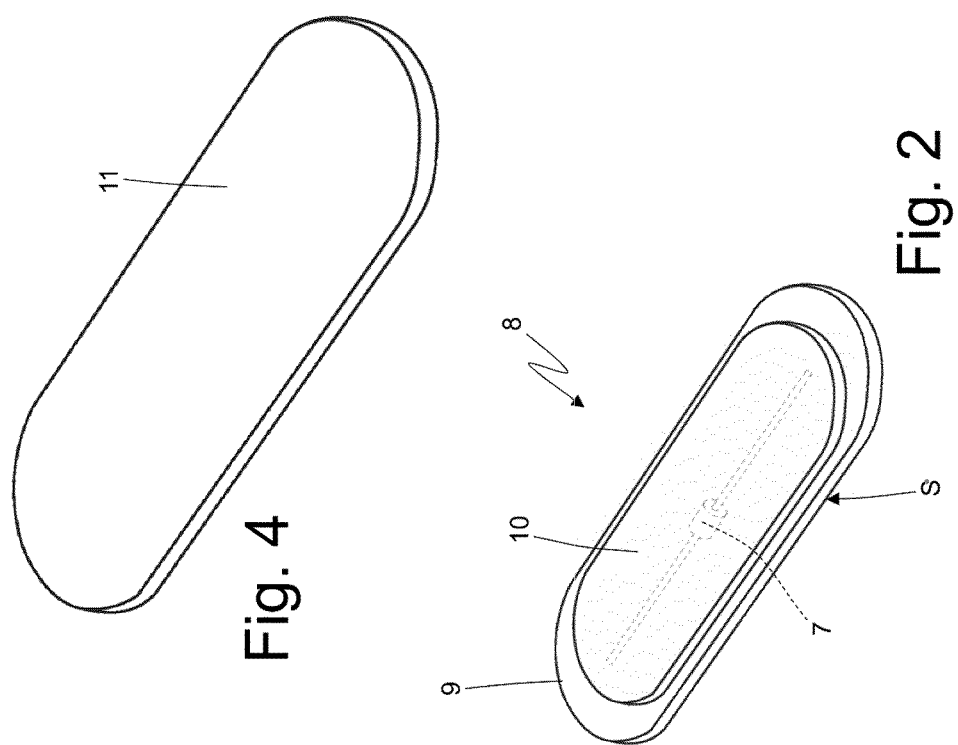
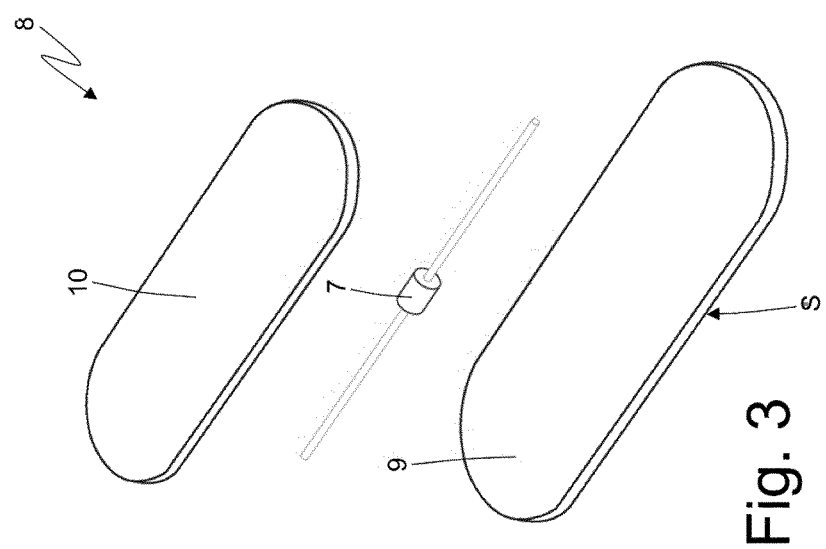

METHOD OF PRODUCING A TIRE EQUIPPED WITH AN ELECTRONIC DEVICE

TECHNICAL SECTOR

The present invention relates to a method of producing a tire equipped with an electronic device (in particular a transponder).

BACKGROUND

In recent years, so-called "smart" tires have emerged, which are capable of forming an active part of modern vehicles, supplying information concerning the type of tires mounted, information concerning the status of the tires and also information concerning environmental conditions.

A "smart" tire is normally equipped with a transponder (that is, an electronic device suitable for communicating in radio frequency) which permits remote communication (that is, to both the vehicle whereupon the tire is mounted and to an operator who must carry out the checking or the replacement of the tire) of the identification, the characteristics and the history of the tire.

Recently, the integration has been proposed of RFID ("Radio-Frequency IDentification") technology, based upon the presence of transponders, and TPMS ("Tire Pressure Monitoring Systems") technology, which measures the effective inflation pressure in order to store within transponders the effective inflation pressure and then remotely communicate the effective inflation pressure by means of the transponders themselves.

Generally, a transponder intended to be coupled to a tire is inserted beforehand into a rubber support (housing) that completely surrounds the transponder on all sides. Subsequently, in order to couple a transponder to a tire, it is possible to attach the transponder to an inner surface of the tire (typically above the innerliner that ensures the air tightness of the tire) or else it is possible to integrate the transponder inside the components that make up the tire structure (i.e., arrange the transponder in the middle of the various layers that make up the tire). Attaching the transponder to an inner surface of the tire does not change the structure of the tire in any way concerning the presence of foreign bodies and therefore ensures that the tire may offer the expected performance. A transponder may be attached to the inner surface of the tire when the tire is still green (i.e., before vulcanizing the tire) or when the tire has already been vulcanized.

During the vulcanization, a layer of lubricant is generally applied which has the function of facilitating the detachment of the tire from the vulcanization mould at the end of the vulcanization process; in particular, the lubricant is interposed between an inner surface of the tire and an inner membrane (expansion bladder) of the vulcanization mould. Consequently, at the end of the vulcanization process, the inner surface of the vulcanized tire has a layer of lubricant which must be locally removed (for example by cleaning with a laser beam) in the area where the transponder is applied (otherwise the transponder may not be able to adhere with adequate force to the tire surface). Consequently, attaching the transponder to the inner surface of the tire when the tire has already been vulcanized requires additional processing (cleaning the area where the transponder is applied) which increases production times and costs. Alternatively, the inner membrane (expansion bladder) of the mould may consist of particular materials, preferably silicone, which contribute to the detachment of the tire without using any additional lubricant (release material); however, in the current state of technology, such inner membranes which do not require lubricant are expensive and of limited life.

In addition, to ensure adequate adhesion of the transponder to the surface of the vulcanized tire, it is necessary to use an adhesive (glue) that is sufficiently strong and compatible with the rubber compound that makes up the tire innerliner, and that does not in any way damage the integrity of the tire innerliner; this adhesive constitutes an additional cost in economic and environmental terms.

It would therefore be preferable, in order to reduce production times and costs, to attach the transponder to the inner surface of the tire when the tire is still green (i.e., before vulcanizing the tire). It has, however, been observed that the high pressure and high temperature reached during the vulcanization process may cause parts of the transponder to emerge outside the rubber support thereof (the so-called "surfacing" phenomenon), often causing a malfunction (if not the complete failure) of the transponder. In addition, the high pressure and high temperature reached during the vulcanization process may bring parts of the transponder into contact with the carcass cords, thereby often causing a malfunction (if not complete failure) of the transponder and as a further consequence, this may negatively interfere with the operation of the carcass cords. Finally, the high pressure and high temperature that are reached during the vulcanization process may cause irregularities in the innerliner (particularly at the edge of the rubber support of the transponder) that in the long run may cause cracks in the innerliner, to the detriment of retention of the air inside the tire with consequent pressure losses.

BRIEF SUMMARY

The purpose of the present invention is to provide a production method for a tire equipped with an electronic device that avoids damage to the tire and to the electronic device and that is at the same time easy and economical to implement.

According to the present invention, a production method for a tire equipped with an electronic device is provided as set forth in the appended claims.

The claims describe preferred embodiments of the present invention that form an integral part of the present description.

BRIEF DESCRIPTION OF THE DRAWINGS

The present invention will now be described with reference to the attached drawings, which illustrate an exemplary, non-limiting embodiment, wherein:

FIGS. 2 and 3 are a perspective view and an exploded perspective view, respectively, of the transponder of FIG. 1 inserted in a rubber support;

FIG. 4 is a perspective view of a smart label;

DETAILED DESCRIPTION

Figure 1:
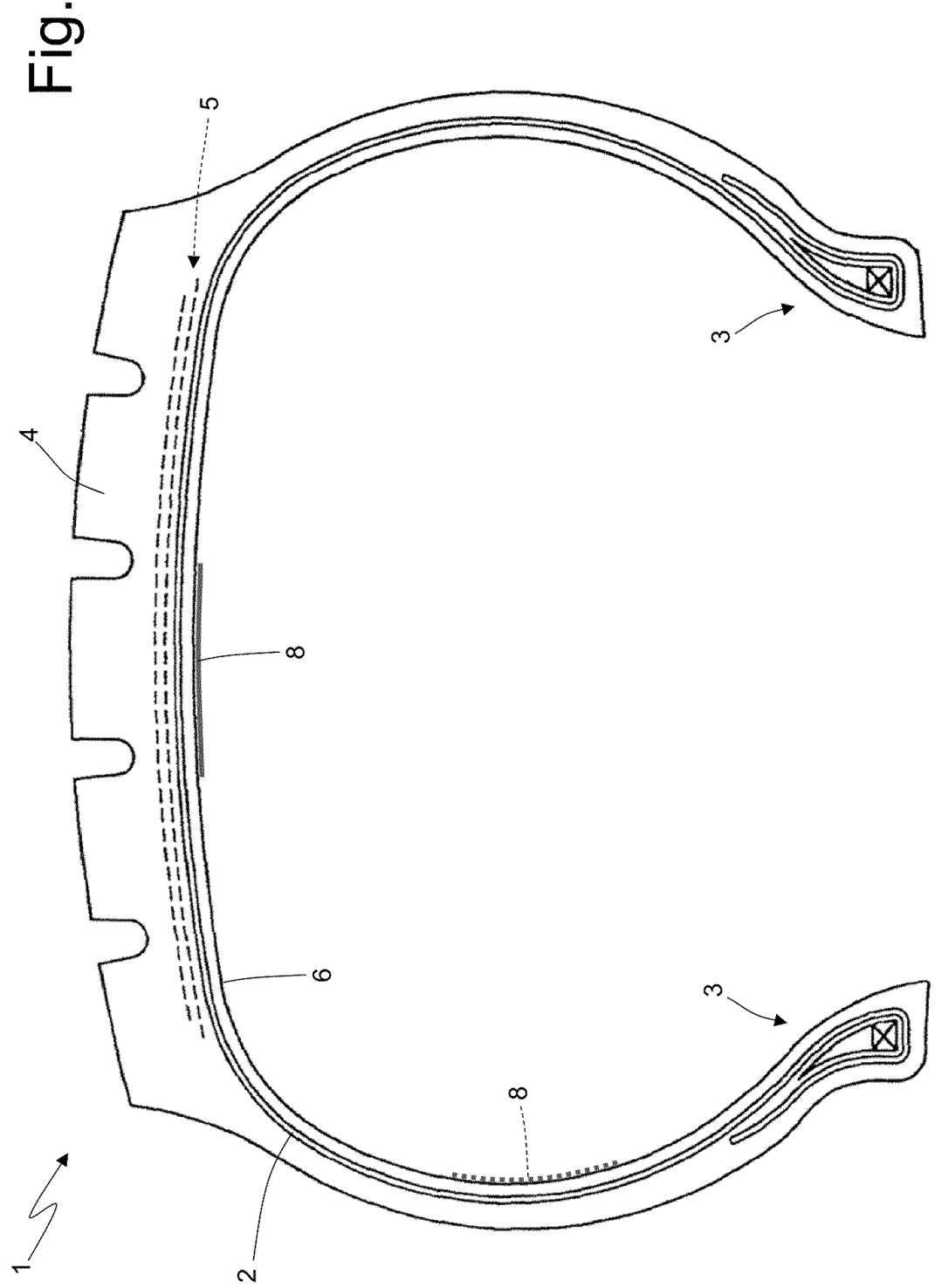
FIG. 1 is a schematic cross-sectional view of a tire provided with a transponder.

In FIG. 1, reference numeral 1 indicates as a whole a tire 1 comprising a toroidal carcass 2, which is partially folded onto itself and therefore has two lateral flaps (i.e., two layers superimposed on one another and jointly referred to as "turn-up"). Two annular beads 3 are provided at opposite sides of the carcass 2, wherein each thereof is surrounded by the carcass 2. The carcass 2 supports an annular tread 4 with the interposition of a tread belt 5. Arranged within the body ply 2 is an innerliner 6 which is airtight, constitutes an inner lining and has the function of retaining the air within the tire 1 in order to maintain the inflation pressure of the same tire 1 over time.

The tire 1 is provided with a transponder 7 (shown in FIGS. 2 and 3), i.e., with an electronic device (normally passive, i.e., without its own power supply) that is capable of storing information and that is able to communicate by means of radio frequency. In other words, the transponder 7 is a "smart label" of small dimensions that is suitable for responding to remote polling on the part of specific fixed or portable devices, called readers (or polling devices); a reader is capable of reading and/or modifying the information contained within the transponder 7 that is being polled whilst communicating with the transponder 7 itself in radio frequency. Accordingly, the transponder 7 is part of a wireless reading and/or writing system that operates according to so-called RFID technology ("Radio-Frequency IDentification").

As illustrated in FIGS. 1, 2 and 3, the transponder 7 is inserted in a support 8 consisting of two components 9 and 10 superimposed and pressed against each other: an inner component 9 which (as better described below) will be arranged in direct contact with the innerliner 6 of the tire 1 and an outer component 10 which (as better described below) will be arranged on the opposite side with respect to the innerliner 6 of the tire 1. Generally, the two components 9 and 10 of the support 8 are longer/wider than the transponder 7. Generally, the two components 9 and 10 are both made of rubber and are composed of exactly the same type of rubber compound; alternatively, the two components 9 and 10 may both be made of rubber and be composed of two different types of rubber compound. According to a different embodiment, only the inner component 9 (i.e., in direct contact with the innerliner 6 of the tire 1) is made of rubber (at least partially green, as better explained below) while the outer component 10 (i.e., arranged on the opposite side with respect to the innerliner 6 of the tire 1) is made of a (plastics) material other than rubber. According to an alternative embodiment, the support 8 may consist only of the component 9 (i.e., the outer component 10 may not be present).

Each component 9 or 10 may have a monolayer structure (i.e., it may consist of a single type of material forming a single homogeneous layer) or it may have a multilayer structure (i.e., it may consist of two or more superimposed materials that form two or more layers).

The inner component 9 has a connection surface S, which faces the innerliner 6 of the tire 1 (i.e., it will be in direct contact with the innerliner 6 of the tire 1) and is therefore arranged on the opposite side of the transponder 7. That is, the inner component 9 has a connection surface S which will be in direct contact with the innerliner 6 of the tire 1 and is arranged on the opposite side of the transponder 7 and a surface opposite the connection surface S on which the transponder 7 rests.

Figure 5:
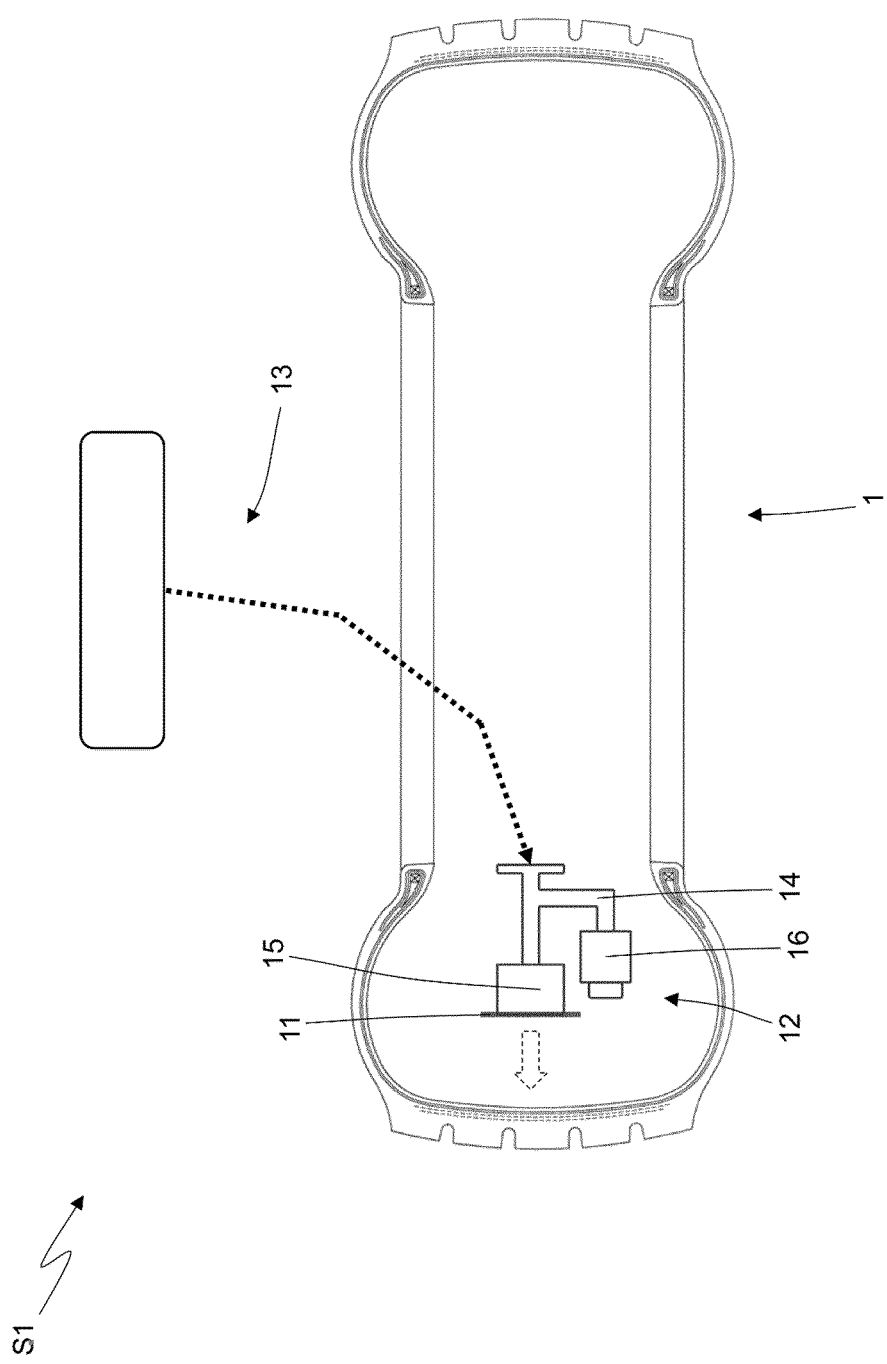
FIGS. 5-9 schematically illustrate various processing stations of a production plant which manufactures the tire of FIG. 1.

The construction of the tire 1 includes forming (in a fully known manner) the green tire 1 and then (when the tire 1 is still green) applying a protective label 11 to a portion of the innerliner 6 (illustrated in FIG. 4) at the area which will subsequently receive the support 8 containing the transponder 7 (coupled to the transponder 7); a different embodiment described below is also envisaged which does not require the use of the protective label 11. In particular, as shown in FIG. 5, the green (i.e., non-vulcanized) tire 1 arrives at an application station S1 of a production plant where an applicator device 12 applies the protective label 11 to the innerliner 6.

Preferably, the protective label 11 is made of polyethylene terephthalate (also known commercially by the name of Mylar). Furthermore, the protective label 11 is preferably larger than the support 8 containing the transponder 7 in such a way as to be able to "compensate" with its larger size for the positioning tolerances (i.e., errors) (both in the positioning of the label 11, and in the positioning of the support 8 containing the transponder 7).

The applicator device 12 is moved by a robotic arm 13 (or by a similar handling device), i.e., the applicator device 12 is mounted at one end of the robotic arm 13. Preferably, the applicator device 12 comprises a frame 14 which is rigidly constrained to the robotic arm 13 and supports both an application head 15 which is configured to pick up the protective label 11 and transfer the protective label 11 to the innerliner 6 of the green tire 1, and a camera 16 which frames the space in front of the application head 15 and is used for guiding the movements of the robotic arm 13.

Figure 6:
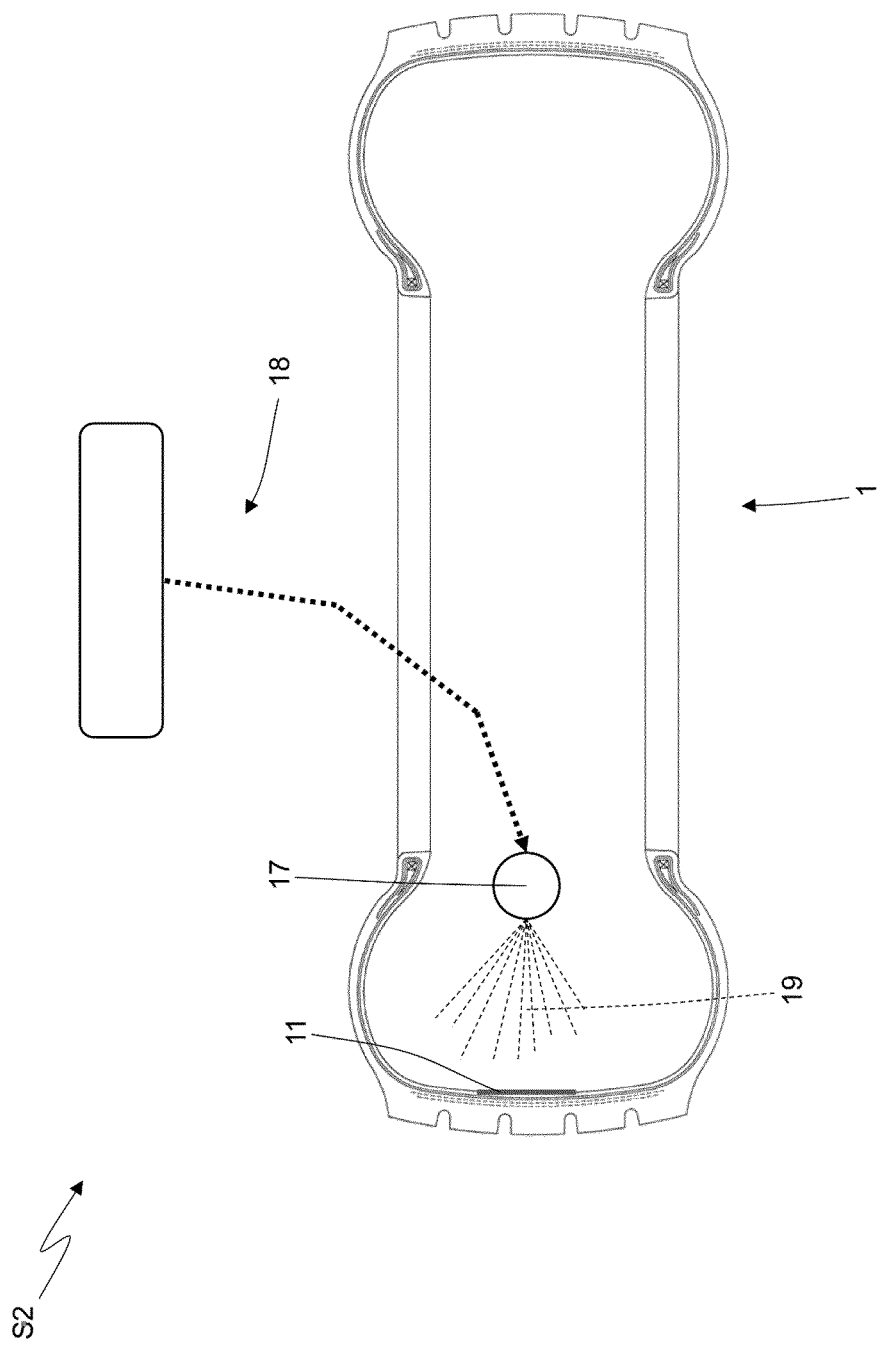

Subsequently and as illustrated in FIG. 6, the green tire 1 provided with the protective label 11 arrives at a lubrication station S2 of the production plant, in which (at least) a sprayer device 17 moved by a robotic arm 18 (or by a similar handling device) deposits a lubricating liquid 19 (which is for example silicone-based) on the entire inner surface of the green tire 1 (therefore also on the innerliner 6 and on the protective label 11 applied to the innerliner 6), which facilitates the detachment of the vulcanized tire 1 from a vulcanization mould 20 (illustrated in FIG. 7 and better described below). Alternatively, in the lubrication station S2 of the production plant, the lubricating liquid 19 is applied on an inner membrane (expansion bladder) of the vulcanization mould 20 instead of the inner surface of the green tire 1 provided with the protective label 11.

Figure 7:
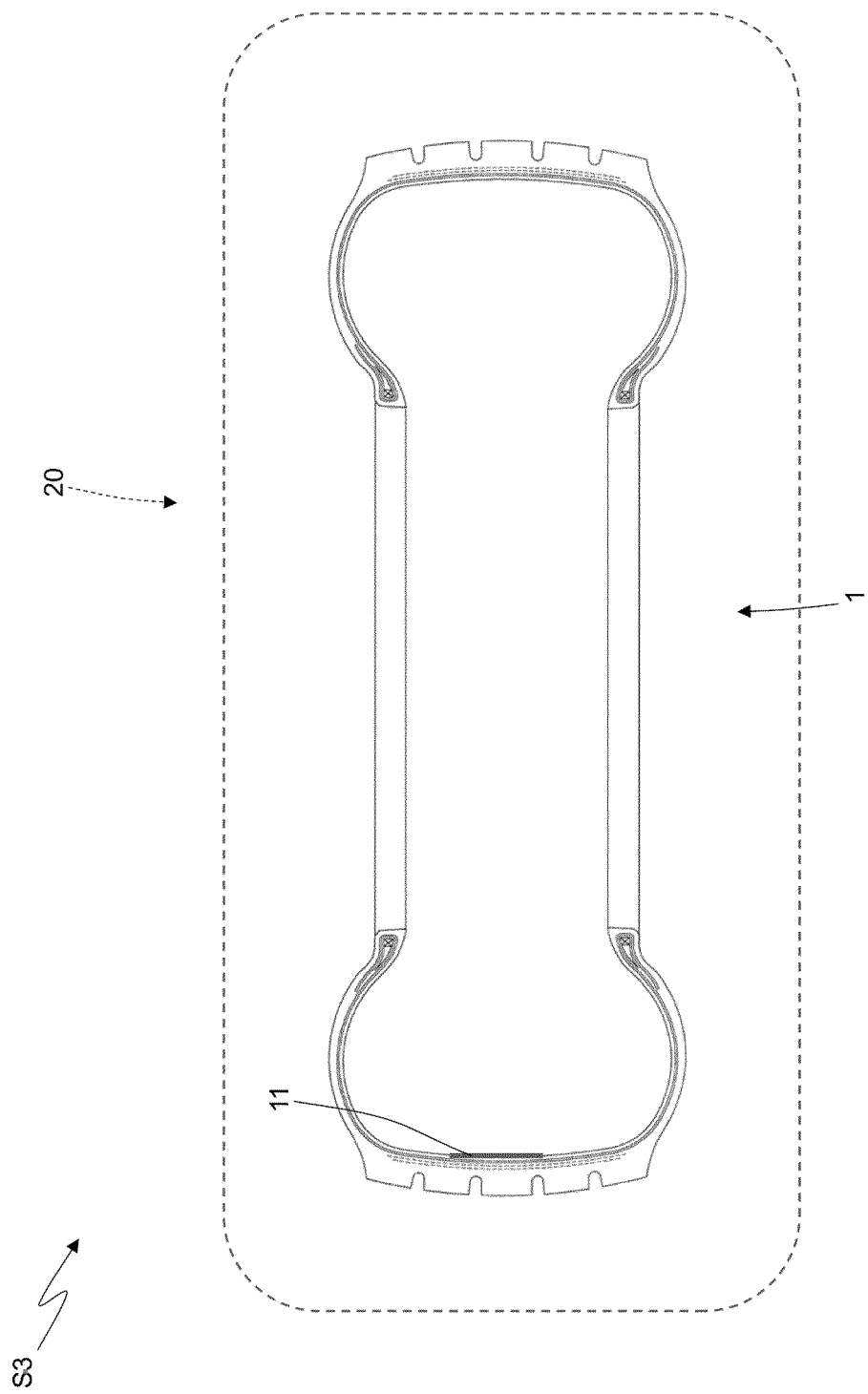

Subsequently and as illustrated in FIG. 7, the green tire 1 provided with the protective label 11 arrives at a vulcanization station S3 of the production plant, in which the green tire 1 is arranged inside the vulcanization mould 20; between an inner surface of the vulcanization mould 20 and the green tire 1 there is interposed a thin layer of lubricating liquid 19 (which may have been applied, at the lubrication station S2, on the vulcanization mould 20 or on the green tire 1). Inside the vulcanization mould 20, the tire 1 is subjected to a vulcanization cycle which involves both a high temperature (of the order of 180° C.) and a high pressure.

Figure 8:
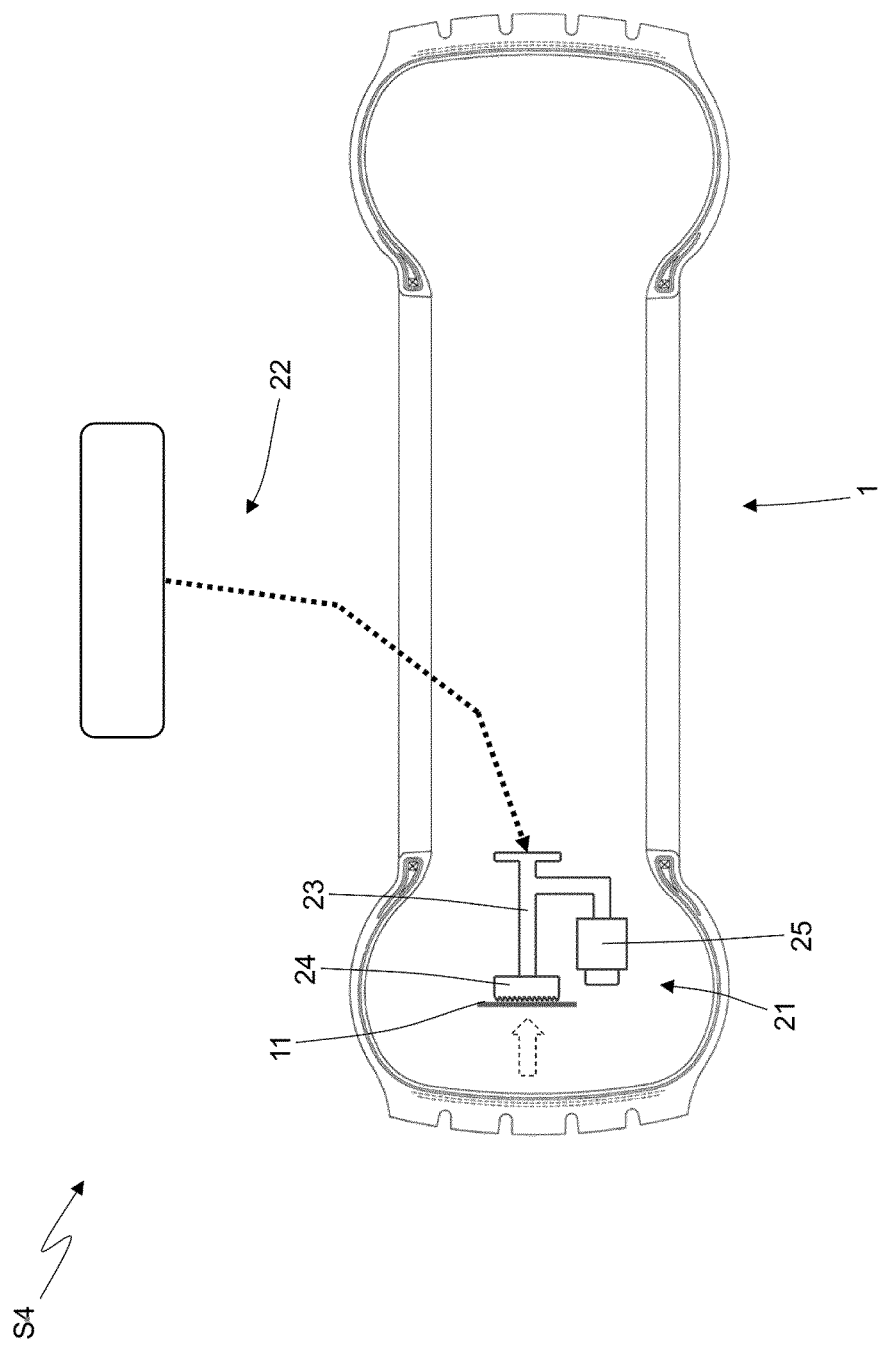

At the end of the vulcanization process and as illustrated in FIG. 8, the vulcanized tire 1 is extracted from the vulcanization mould 20 and, after the extraction from the vulcanization mould 20, the vulcanized tire 1 arrives at an application station S4. In the application station S4, the protective label 11 is initially removed from the innerliner 6 of the vulcanized tire 1 by means of a removal device 21 so as to reveal the underlying portion of the innerliner 6 which is completely devoid of the lubricating liquid 19 (obviously in the case in which the protective label 11 is actually present).

The removal device 21 is moved by a robotic arm 22 (or by a similar handling device), i.e., the removal device 21 is mounted at one end of the robotic arm 22. Preferably, the removal device 21 comprises a frame 23 which is rigidly constrained to the robotic arm 22 and supports both a pick-up head 24 which is configured to remove the protective label 11 from the innerliner 6 of the vulcanized tire 1, and a camera 25 which frames the space in front of the pick-up head 24 and is used for guiding the movements of the robotic arm 22.

Figure 9:
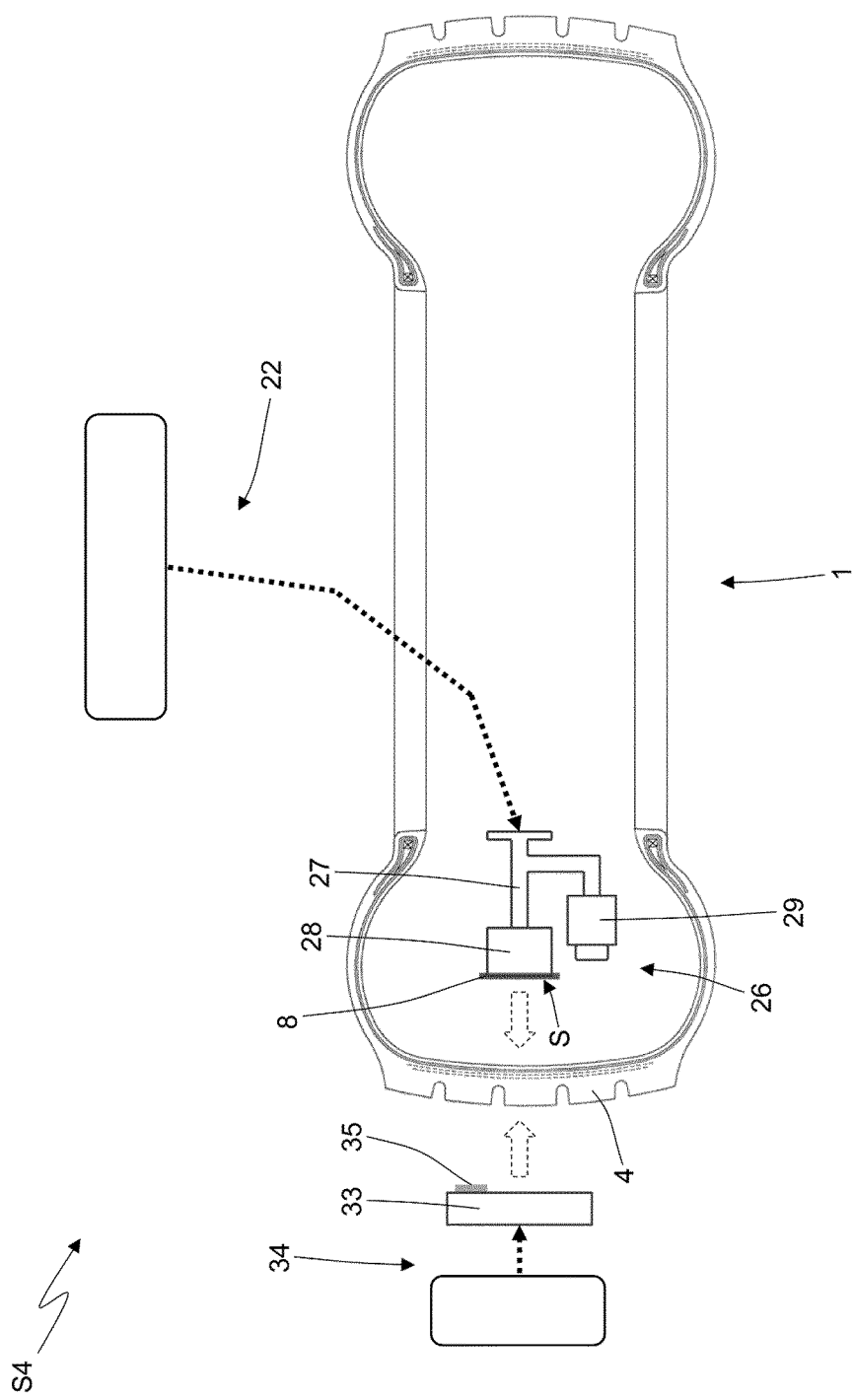

As illustrated in FIG. 9, immediately after the protective label 11 has been removed from the innerliner 6 of the vulcanized tire 1 so as to reveal the underlying portion of the innerliner 6 which is completely free of the lubricating liquid 19, an applicator device 26 applies the support 8 containing the transponder 7 to the innerliner 6 of the vulcanized tire 1 in the area of the innerliner 6 that is devoid of the lubricating liquid 19 since it was previously covered by the protective label 11.

The applicator device 26 is moved by the robotic arm 22 (or by a similar handling device), i.e., the applicator device 26 is mounted at one end of the robotic arm 22. Preferably, the applicator device 26 comprises a frame 27 which is rigidly constrained to the robotic arm 22 and supports both an application head 28 which is configured to pick up the support 8 and transfer the support 8 to the innerliner 6 of the vulcanized tire 1, and a camera 29 which frames the space in front of the application head 28 and is used for guiding the movements of the robotic arm 22.

Figure 10:
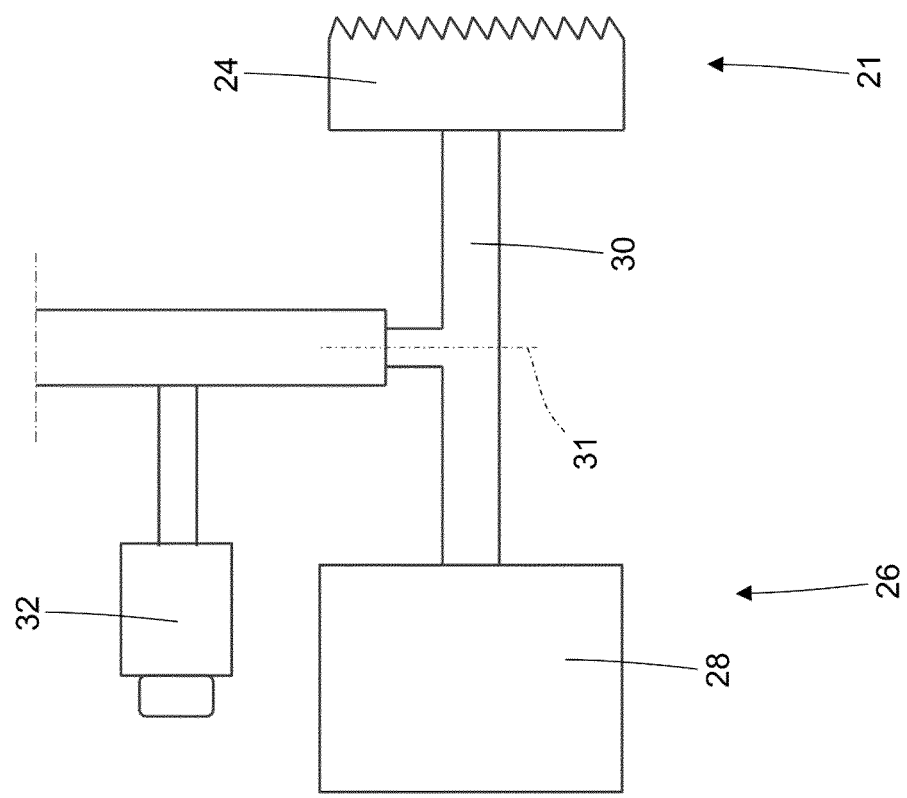
FIG. 10 is a schematic view of a tool used in an application station of the production plant.

According to a possible embodiment, the same robotic arm 22 first moves the removal device 21 to remove the protective label 11 from the innerliner 6 of the vulcanized tire 1 and immediately afterwards exchanges the removal device 21 with the applicator device 26 (i.e., releases the removal device 21 and then withdraws the applicator device 26) to apply the support 8 to the innerliner 6 of the vulcanized tire 1. According to an alternative embodiment, two different robotic arms 22 are provided to move the removal device 21 and the applicator device 26 completely independently. According to a further embodiment illustrated in FIG. 10, the applicator device 26 which applies the support 8 containing the transponder 7 to the innerliner 6 and the removal device 21 which removes the protective label 11 from the innerliner 6 are supported together (simultaneously) by a same robotic arm 22 which is movable to enter and exit the interior of the vulcanized tire 1; in particular, the applicator device 26 and the removal device 21 are mounted on the robotic arm 22 by means of a rotatable support element 30 which is rotated about an axis of rotation 31 to alternatively arrange the applicator device 26 or the removal device 21 towards the innerliner 6. In this embodiment, a single camera 32 may be provided which does not rotate (i.e., is not connected to the support element 30), is common for both devices 21 and 26, and therefore replaces the cameras 25 and 29.

The support 8 containing the transponder 7 is applied on the innerliner 6 of the vulcanized tire 1 after the tire 1 has been extracted from the vulcanization mould 20 and when a surface temperature of the innerliner 6 deriving from the heating of the vulcanization process is higher than 90° C. (preferably 100-110° C.). In other words, the support 8 containing the electronic device 7 is applied to the innerliner 6 after a certain latency time from the instant in which the vulcanized tire 1 has been extracted from the vulcanization mould 20 and in any case when the tire 1 is still (sufficiently) hot due to the heating applied during the vulcanization process; this latency time must not be too long (to prevent the surface temperature of the innerliner 6 deriving from the heating of the vulcanization process from being too low, i.e., lower than 90° C.).

According to a possible embodiment, the (maximum) duration of the latency time is established in advance and is therefore kept constant; according to an alternative embodiment, the surface temperature of the innerliner 6 is measured (for example with a common infrared non-contact thermometer) and therefore the (maximum) duration of the latency time is continuously variable as it depends on when the surface temperature of the innerliner 6 reaches the minimum value. In this regard, it is important to observe that the tire 1 has a high thermal capacity combined with a low thermal conductivity (rubber is a thermal insulator) and therefore the cooling of the tire 1 extracted from the vulcanization mould 20 is relatively slow and therefore it is easy to apply the support 8 containing the electronic device 7 to the innerliner 6 when the surface temperature of the innerliner 6 deriving from the heating of the vulcanization process is still sufficiently high.

The support 8 (particularly the inner component 9 of the support 8) comprises at least partially green rubber which is subjected to vulcanization (also) due to the effect of the residual heat possessed by the tire 1 after the extraction of the tire 1 from the vulcanization mould 20 (i.e., of the residual heat that remains from the heating performed during the vulcanization process); it is therefore necessary that the support 8 containing the transponder 7 is applied onto the innerliner 6 of the vulcanized tire 1 within a certain time interval from the extraction of the tire 1 from the vulcanization mould 20, i.e., when the tire 1 is still sufficiently hot due to the heat received during the vulcanization process.

As previously stated, at least the inner component 9 of the support 8 consists of at least partially green rubber or of rubber which has not yet begun or in any case has not yet completed a vulcanization process; in other words, the inner component 9 has at least partially green rubber which constitutes the connection surface S (i.e., the surface in direct contact with the innerliner 6 of the tire 1). In particular, at least the rubber which constitutes the connection surface S of the inner component 9 (and therefore which is in direct contact with the innerliner 6 of the tire 1) has a lower degree of vulcanization than the rubber of the (possible) outer component 10 which it is not in direct contact with the innerliner 6 of the tire 1; for example, the rubber of the inner component 9 is completely green and the rubber of the (possible) outer component 10 is partially vulcanized, or the rubber of both components 9 and 10 is partially vulcanized but has different degrees of vulcanization (a higher degree of vulcanization for the outer component 10 and a lower degree of vulcanization for the inner component 9).

Preferably but not necessarily, the inner component 9 is composed of completely green rubber, i.e., rubber that has never been vulcanized in any way, not even partially), or of only partially vulcanized rubber, i.e., rubber wherein the vulcanization has begun but has not been completed, i.e., rubber that is neither completely green nor completely vulcanized. Preferably but not necessarily, the outer component 10 (if present) is composed of only partially vulcanized rubber, i.e., rubber wherein the vulcanization has begun but has not been completed, i.e., rubber that is neither completely green nor completely vulcanized, or completely vulcanized rubber.

The connection surface S of the inner component 9 which is in direct contact with the innerliner 6 must ensure adhesion with the innerliner 6 and therefore must be less vulcanized (and therefore have a greater adhesion capacity) while the outer component 10 (if present) which covers the transponder 7 must guarantee the protection of the transponder and therefore must be able to have a higher degree of vulcanization (and therefore be harder and more resistant, also to the detriment of the adhesion capacity).

According to a different embodiment, it is possible to spray, before inserting the green tire 1 into the vulcanization mould 20, on the inner surface of the green tire 1 or on the inner membrane (expansion bladder) of the vulcanization mould 20, a lubricating liquid 19 which does not hinder the adhesion of the support 8 containing the transponder 7 to the innerliner 6; in this embodiment, the presence of the protective label 11 (and therefore of the applicator device 12 and of the removal device 21) is no longer necessary, since the lubricating liquid 19 does not hinder the adhesion of the support 8 containing the transponder 7 to the innerliner 6.

According to a further embodiment, the protective label 11 is not applied and the removal device 21 is replaced by a cleaning device which cleans (for example by means of a laser) the area of the innerliner 6 on which the support 8 containing the transponder 7 must then be applied.

According to a further embodiment, no lubricating liquid 19 is applied to the inner surface of the green tire 1 or to the inner membrane (expansion bladder) of the vulcanization mould 20, since the inner membrane (expansion bladder) of the vulcanization mould 20 has a low adherence surface which does not require the presence of the lubricating liquid 19; obviously in the absence of the lubricating liquid 19, the presence of the protective label 11 (and therefore of the applicator device 12 and of the removal device 21) is no longer necessary.

According to a preferred embodiment shown in FIG. 9, a contrast element 33 is provided in the application station S4, which contrast element is moved by an actuator device 34, is arranged outside the tire 1 and is located at the applicator device 26. In particular, the contrast element 33 is rested, when the support 8 containing the transponder 7 is applied to the innerliner 6, against the outside of the vulcanized tire 1 at, or on the opposite side of, the area of the innerliner 6 in which the support 8 containing the transponder 7 is applied. In this way, the applicator device 26 may forcefully press the support 8 containing the transponder 7 against the innerliner 6 since the thrust exerted by the applicator device 26 is adequately opposed by the contrast element 33 without causing unwanted deformations of the tire 1 (which is still hot having left the vulcanization mould 20 for a limited time). In particular, the actuator device 34 presses (with a certain predetermined force) the contrast element 33 against the outside of the vulcanized tire 1 when, from the opposite side, the applicator device 26 applies the support 8 containing the transponders 7 to the innerliner 6 of the vulcanized tire 1. Depending on the positioning of the transponder 7 on the innerliner 6 of the tire 1, the contrast element 33 may press against the tread 4 of the tire 1 or against a side wall (side) of the tire 1.

According to a possible embodiment, a surface of the contrast element 33 which comes into contact with the outside of the vulcanized tire 1 bears a (small) relief pattern 35 (an inscription and/or a logo) which indicates the presence and the position of transponder 7; preferably, the relief pattern 35 is heated to be able to better impress the relief pattern 35 on the outside (tread 4 or side) of the vulcanized tire 1. The function of the relief pattern 35 imprinted on the outside (tread 4 or side) of the vulcanized tire 1 is to indicate from the outside the position of the transponder 7.

According to a preferred, non-binding embodiment, the support 8 containing the transponder 7 is heated before applying the support 8 to the innerliner 6 of the vulcanized tire 1; more generally, at least the connection surface S of the inner component 9 of the support 8 containing the transponder 7 is heated before applying the support 8 to the innerliner 6 of the vulcanized tire 1. According to a preferred embodiment, the support 8 containing the transponder 7 (or better at least the connection surface S of the inner component 9) has, at the time of application to the innerliner 6 of the vulcanized tire 1, a temperature between 90° C. and 110° C. and preferably equal to about 100° C. According to a different embodiment, the support 8 containing the transponder 7 (or rather at least the connection surface S of the inner component 9) has, at the time of application to the innerliner 6 of the vulcanized tire 1, a temperature substantially equal (similar) to the surface temperature of the innerliner 6.

Figure 11:
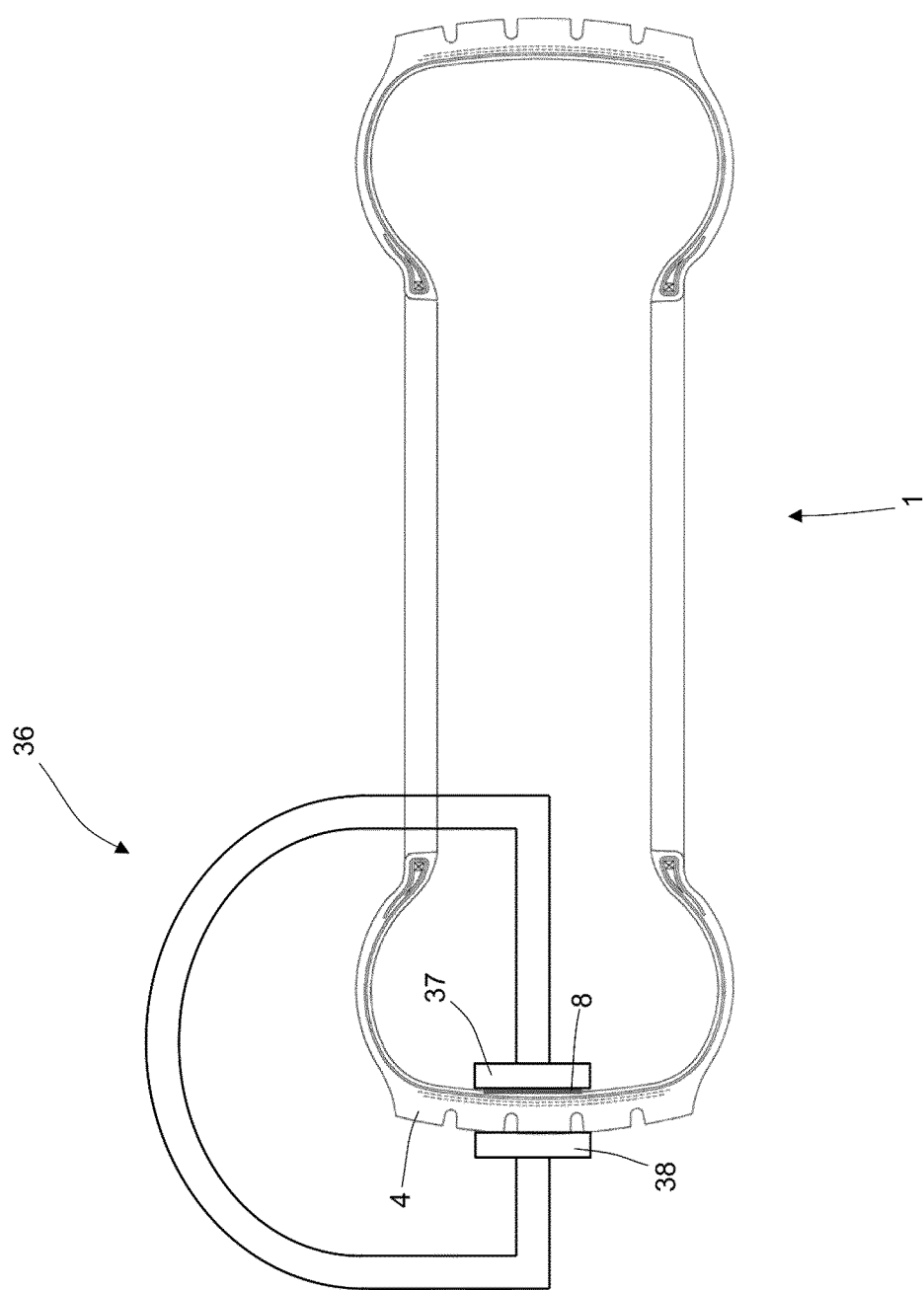
FIG. 11 is a schematic view of a gripper used in the production plant.

According to a possible embodiment illustrated in FIG. 11, after having applied the support 8 containing the transponder 7 to the innerliner 6 of the vulcanized tire 1, a compression is applied and maintained (for a relatively long time, for example several minutes) to the support 8, which pushes the support 8 against the innerliner 6. The compression applied to the support 8 is generally between 5 and 15 bars and is preferably equal to 10 bars; furthermore, the compression applied to the support 8 is maintained for a time interval generally ranging from 10 to 30 minutes and preferably equal to 20 minutes. In particular, the compression is applied by means of a ratchet gripper 36 provided with an internal jaw 37 which rests against the support 8 and an external jaw 38 which rests against the outside (tread 4 or side) 4 of the vulcanized tire 1. A ratchet is a mechanical device consisting of a toothed wheel and a coplanar beak or tooth which allows movement in one direction only; therefore the ratchet gripper 36 allows a compression force to be applied and maintained between the two jaws 37 and 38. According to a possible embodiment, the internal jaw 37 is heated by means of a heater device in such a way as to heat (as well as press) the support 8 containing the transponder 7.

To summarize what has been described above, upon the opening of the vulcanization mould 20 the vulcanization of the tire 1 is practically completed but the high vulcanization temperature and its thermal inertia lead to having sufficient thermal energy to complete the vulcanization of the support 8 containing the transponder 7 (especially if the support 8 is partially pre-vulcanized); the degree of pre-vulcanization of the support 8 is selected to guarantee the complete (or almost complete) vulcanization of the support 8 in the "dead" time which elapses from the extraction of the vulcanized tire 1 from the vulcanization mould 20 to the subsequent processing step of the vulcanized tire 1. In this way, optimal adhesion of the support 8 to the innerliner 6 of the vulcanized tire 1 is ensured without damaging the innerliner 6.

In particular, it has been observed that overall the best result is obtained if the support 8 containing the transponder 7 is applied to the innerliner 6 of the vulcanized tire 1 when the surface temperature of the innerliner 6 is (still) high enough to ensure adequate vulcanization of the support 8.

The embodiments described herein may be combined without departing from the scope of protection of the present invention.

The production method described above has many advantages.

Firstly, the production method described above is particularly simple and cost-effective to implement as it requires the execution of a few easily automatable operations and as it exploits, for the application of the support 8 containing the transponder 7, the dead times existing in the production cycle of the tire 1 in the instants following the extraction of the vulcanized tire 1 from the vulcanization mould 20.

Furthermore, the production method described above allows damage to the tire and to the transponder 7 to be prevented.

The production method described above does not require the use of any adhesive to glue the support 8 containing the transponder 7 to the innerliner 6, since only the adhesion force established between two rubber layers subjected to pressure at a certain temperature is used to have the support 8 adhere to the innerliner 6; in this way, both the cost and the environmental impact are reduced.

Finally, the production method described above ensures adequately strong and resistant adhesion of the transponder 7 to the tire 1, thereby avoiding the risk that the transponder 7 may detach itself, even partially, from the tire 1.

LIST OF REFERENCE NUMBERS IN THE FIGURES 1 transponder
2 carcass
3 beads
4 tread
5 tread belt
6 innerliner
7 transponder
8 support
9 internal component
10 external component
11 protective label
12 applicator device
13 robotic arm
14 frame
15 application head
16 camera
17 spray device
18 robotic arm
19 lubricating liquid
20 vulcanization mould
21 removal device
22 robotic arm
23 frame
24 removal head
25 camera
26 applicator device
27 frame
28 application head
29 camera
30 support element
31 axis of rotation
32 camera
33 contrast element
34 actuator device
35 relief pattern
36 gripper
37 internal jaw
38 external jaw
S connection surface
S1 application station
S2 lubrication station
S3 vulcanization station
S4 application station

The invention claimed is:

1. A method for producing a tire equipped with an electronic device, the method comprising:
coupling the electronic device to a support provided with at least one at least partially raw rubber component having a connection surface;
forming a green tire comprising an innerliner;
inserting the green tire into a vulcanization mould;
subjecting the green tire which is inside the vulcanization mould to a vulcanization process;
extracting the vulcanized tire from the vulcanization mould at the end of the vulcanization process; and
applying the support coupled to the electronic device onto the innerliner of the vulcanized tire, resting the connection surface of the support in direct contact with the innerliner;
wherein the support coupled to the electronic device is applied to the innerliner of the tire when a surface temperature of the innerliner deriving from the heating of the vulcanization process is higher than 90° C.;
applying a protective label to the innerliner of the green tire at an area where the support coupled to the electronic device is to be applied;
applying a lubricating liquid between an inner surface of the green tire and an inner membrane of the vulcanization mould; and
removing the protective label from the innerliner of the vulcanized tire after extracting the tire from the vulcanization mould and before applying the support coupled to the electronic device;
wherein an applicator device, which applies the support coupled to the electronic device to the innerliner, and a removal device, which removes the protective label from the innerliner, are supported together by a same arm which is movable to enter and exit inside of the vulcanized tire.

2. The method of claim 1, wherein the support coupled to the electronic device is applied to the innerliner of the tire when the surface temperature of the innerliner deriving from the heating of the vulcanization process is higher than 110° C.

3. The method of claim 1, further comprising heating at least the connection surface of the support coupled to the electronic device before applying the support to the innerliner of the vulcanized tire.

4. The method of claim 3, wherein at least the connection surface of the support coupled to the electronic device has, at a time of application to the innerliner of the vulcanized tire, a temperature between 90° C. and 110° C.

5. The method of claim 1, further comprising, after applying the support coupled to the electronic device to the innerliner of the vulcanized tire, applying and maintaining a compression to the support which pushes the support against the innerliner.

6. The method of claim 5, wherein the compression is applied via a ratchet gripper provided with an internal jaw which rests against the support and an external jaw which rests against the outside of the vulcanized tire.

7. The method of claim 6, wherein the internal jaw is heated by a heater device.

8. The method of claim 5, wherein the compression applied to the support is between 5 and 15 bars.

9. The method of claim 5, wherein the compression applied to the support is maintained for a time interval ranging from 10 to 30 minutes.

10. The method of claim 1, wherein the support comprises an inner component and an outer component which enclose the electronic device therebetween.

11. The method of claim 10, wherein the inner component, which is arranged in direct contact with the innerliner of the vulcanized tire and has the connection surface, comprises rubber which has a lower degree of vulcanization than the rubber constituting the outer component.

12. The method of claim 1, wherein the protective label is made of polyethylene terephthalate.

13. The method of claim 1, wherein the protective label is larger than the support coupled to the electronic device.

14. The method of claim 1, wherein the applicator device and the removal device are mounted on the arm via a rotatable support member which is rotated to alternately arrange the applicator device or the removal device toward the innerliner.

15. The method of claim 1, further comprising spraying, before inserting the green tire into the vulcanization mould, and between an inner surface of the green tire and an inner membrane of the vulcanization mould, a lubricating liquid which does not hinder adhesion of the support coupled to the electronic device to the innerliner.

16. A method for producing a tire equipped with an electronic device, the method comprising:
  coupling the electronic device to a support provided with at least one at least partially raw rubber component having a connection surface;
  forming a green tire comprising an innerliner;
  inserting the green tire into a vulcanization mould;
  subjecting the green tire which is inside the vulcanization mould to a vulcanization process;
  extracting the vulcanized tire from the vulcanization mould at the end of the vulcanization process; and
  applying the support coupled to the electronic device onto the innerliner of the vulcanized tire, resting the connection surface of the support in direct contact with the innerliner;
  wherein the support coupled to the electronic device is applied to the innerliner of the tire when a surface temperature of the innerliner deriving from the heating of the vulcanization process is higher than 90° C.;
  further comprising supporting, when the support coupled to the electronic device is applied to the innerliner, a contrast element against an exterior of the vulcanized tire at, or on an opposite side of, an area of the innerliner in which the support coupled to the electronic device is applied.

17. The method of claim 16, wherein a surface of the contrast element which contacts the outside of the vulcanized tire bears a relief pattern indicating a presence and a position of the electronic device, wherein the relief pattern of the contrast element is heated.

18. The method of claim 16, wherein the support coupled to the electronic device is applied to the innerliner of the tire when the surface temperature of the innerliner deriving from the heating of the vulcanization process is higher than 110° C.

19. The method of claim 16, wherein the rubber constituting the connection surface of the support is vulcanized at least partially in contact with the innerliner of the tire and by effect of the residual heat deriving from the heating of the vulcanization process.

20. The method of claim 16, further comprising heating at least the connection surface of the support coupled to the electronic device before applying the support to the innerliner of the vulcanized tire, wherein at least the connection surface of the support coupled to the electronic device has, at a time of application to the innerliner of the vulcanized tire, a temperature between 90° C. and 110° C.

* * * * *